United States Patent [19]

Torres-Verdin et al.

[11] Patent Number: 5,767,680
[45] Date of Patent: Jun. 16, 1998

[54] METHOD FOR SENSING AND ESTIMATING THE SHAPE AND LOCATION OF OIL-WATER INTERFACES IN A WELL

[75] Inventors: Carlos Torres-Verdin, Ridgefield, Conn.; Sheng Fang, Salt Lake City, Utah; Vladimir Druskin, Ridgefield, Conn.; Ian Bryant, Ridgefield, Conn.; Metin Karakas, Ridgefield, Conn.

[73] Assignee: Schlumberger Technology Corporation, Ridgefield, Conn.

[21] Appl. No.: 661,497

[22] Filed: Jun. 11, 1996

[51] Int. Cl.$^6$ .............................. G01L 3/08; G01L 3/10; E21B 47/00
[52] U.S. Cl. ...................... 324/355; 324/325; 166/250.01
[58] Field of Search ............................ 324/347, 354–356, 324/357, 359, 360, 366–370, 324, 325; 364/422; 166/250.01, 250.03; 175/40, 50

[56] References Cited

U.S. PATENT DOCUMENTS

| | | | |
|---|---|---|---|
| 3,838,335 | 9/1974 | Miller | 324/336 |
| 5,038,108 | 8/1991 | Lessi et al. | 324/355 |
| 5,127,457 | 7/1992 | Stewart et al. | 166/306 |
| 5,215,149 | 6/1993 | Lu | 166/303 |
| 5,297,627 | 3/1994 | Sanchez et al. | 166/272 |

OTHER PUBLICATIONS

McCarthy, J.F., "Analytical Solutions of 2D Cresting Models Using the Hodogaph Method", *Transport in Porous Media*, 1994 Kluwer Academic Publishers, vol. 15 (1994) pp. 251–269.

Ozkan, E and Raghaven, R., "*A Breakthrough Time Correlation for Coning Toward Horizontal Wells*", SPE 20964, pp. 209–218, 1990.

Guo, Boyun and Lee, R.L., "*Determination of the Maximum Water-Free Production Rate of a Horizontal Well With Water/Oil/Interface Cresting*", SPE 24324, pp. 167–176, 1992.

*Primary Examiner*—Walter E. Snow
*Attorney, Agent, or Firm*—Brigitte L. Jeffrey; Keith G. W. Smith; David Garrod

[57] ABSTRACT

Inception of hydrocarbon extraction from a reservoir causes the oil-water interface to warp and cusp toward the extraction gates along a well. This invention proposes time-lapse DC/AC measurements with an array of permanently deployed sensors in order to detect and estimate the change in geometry and proximity of the oil-water interface as a result of production, and therefore as a function of time. The estimation is carried out with a parametric inversion technique whereby the shape of the oil-water interface is assumed to take the form of a three-dimensional surface describable with only a few unknown parameters. A non-linear optimization technique is used to search for the unknown parameters such that the differences between the measured data and the numerically simulated data are minimized in a least-squares fashion with concomitant hard bound physical constraints on the unknowns. The proposed estimation procedure is robust in the presence of relatively high levels of noise and can therefore be used to anticipate deleterious water breakthroughs, as well as improve the efficiency with which the oil is produced from the reservoir.

12 Claims, 2 Drawing Sheets

METHOD FOR SENSING AND ESTIMATING THE SHAPE AND LOCATION OF OIL-WATER INTERFACES IN A WELL

U.S. Pat. application Ser. No. 08/340,837, filed Nov. 17, 1994, now U.S. Pat. No. 5,642,051, discloses related subject matter and is incorporated herein be reference.

BACKGROUND OF THE INVENTION

The present invention relates to a method for sensing and estimating the geometrical shape and proximity of oil-water contacts from hydrocarbon producing horizontal and vertical wells.

One of the applications of horizontal wells is the development of thin oil columns that are underlain by water (oil rims). In this situation, development of traditional vertical or deviated wells is not economical, the reason being that when a pressure drop is applied in the well, in order to produce the oil to the surface, the water is drawn upward in a cone around the well bore. At this point, the well produces mostly water while only a small fraction of the oil in the reservoir has been produced from the reservoir. Water coning is a serious problem in many oil field applications. The production of coned water can reduce oil production significantly. Therefore, it is important to minimize or at least delay coning. By producing through wells that have been drilled horizontally within the reservoir, this problem is often minimized. The pressure drop is distributed along a much longer well length, thereby reducing the tendency to immediately draw water toward the well. The production of oil through a well that horizontally penetrates an oil layer underlain by a water zone causes the oil-water interface to deform into a crest shape. As the production rate is increased, the height of the water crest above the original oil-water contact also increases until at a certain production rate the water crest becomes unstable and water is produced into the well. One of the reasons for drilling horizontal wells is to enhance the oil production rate in some areas where the water coning is a severe problem in vertical wells. However, the encroachment of the water crest is still a limitation for further improving oil production rate in horizontal wells.

SUMMARY OF THE INVENTION

The disadvantages of the prior art are overcome by means of the subject invention which comprises a method of estimating a location and a shape of an oil-water interface during oil production in an earth formation traversed by a well. The method comprises the steps of injecting or inducing an electric current into the formation and acquiring measurements of an electrical parameter in the formation. The electrical parameter is either an electric DC signal or an electromagnetic AC signal. The method further comprises the steps of assigning a 3-D geometrical shape to the oil-water interface and selecting a parametric function which describes the oil-water interface. The geometrical shape may comprise a cone, parabola, hyperbola, or a combination of simple canonical functions. The method further comprises the step of inverting the parametric function to determine the location and the shape of the oil-water interface. In order to monitor the encroachment of a water column towards the well, these steps are continuously repeated as a function of time during oil production. In order to control the encroachment of a water column towards the well, the subject invention further comprises the step of positioning each of a plurality of extraction gates thereby precluding entry of the water column into the well.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 1:
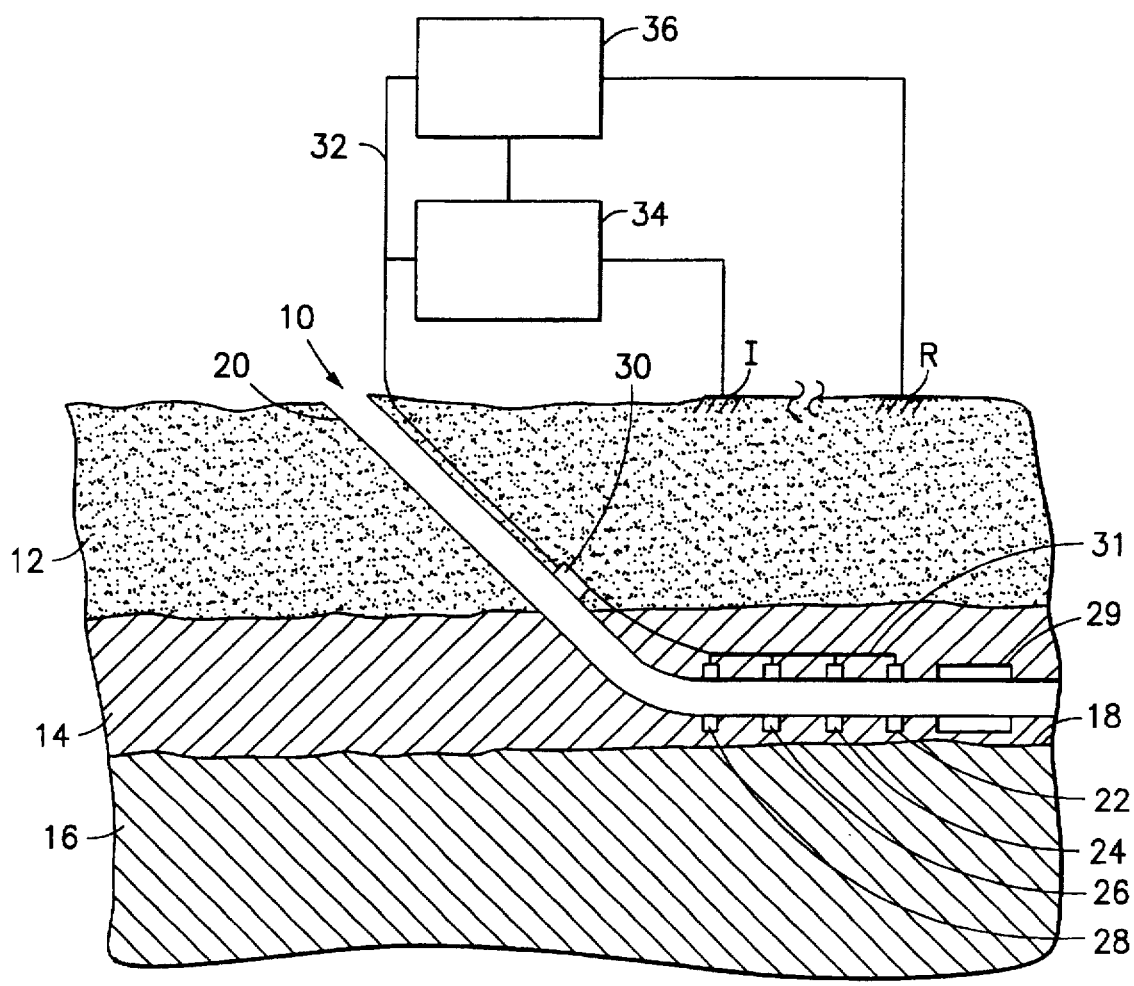
FIG. 1 is a side elevational view depicting a cross section of a horizontal well; and, FIG. 2 is a side elevational view depicting a cross section of a vertical well.

FIG. 1 depicts a horizontal well 10 drilled in an earth formation. The completed well 10 may either have an open hole, a slotted liner, or a cased hole with perforations to enable inflow of hydrocarbons into the well 10. It is within contemplation of the subject invention to complete the well 10 with liners having external casing packers or cemented and perforated liners. The well 10 passes through a geological formation 12 and into a hydrocarbon bearing formation 14. A tube 20 extends horizontally within the hydrocarbon-bearing formation 14, above the oil-water interface 18 and the water-bearing formation 16. The tube 20 is made of an electrically insulating material such as fiberglass, ceramic, or a similar material. During operation of the cased hole well 10, formation fluids enter through perforation gates and are subsequently transferred to the earth surface via the tube 20.

Still referring to FIG. 1, a plurality of electrodes 22, 24, 26, 28 are mounted at predetermined separation lengths along the outer surface of the tube 20. The separation lengths may be optimized based upon such factors as the overall length of extraction limitations imposed by placement of the well 10. These electrodes 22, 24, 26, 28 may be formed by rings or contact surfaces comprised of a conductive material that is a chemically inert metal which maximizes the efficiency with which electric contact is established with the surrounding formations 14, 16. Such materials include, but are not limited to, copper, cadmium, silver, stainless steel, and titanium. In an alternative embodiment of the invention, each electrode 22, 24, 26, 28 may consist of coil windings. The electrodes 22, 24, 26, 28 are fixedly mounted onto the tube 20, or, in the case of a segmented tube, mounted between segments of the tube. The electrodes 22, 24, 26, 28 are connected by cable 31 to the electronic means 30 shown symbolically in FIG. 1 and fixed to the outside of the tube 20. The electronic means 30 is connected to the surface by a electric connecting cable 32, connected to a current source 34 and a data acquisition system 36 for measuring and processing information received from the electrodes 22, 24, 26, 28. The current source 34 generates either a continuous current or a low frequency alternating current in the range from zero to approximately 1 MHz. In the case of continuous current, each electrode 22, 24, 26, 28 may act equally as a current source or a voltage sensor. In the case of alternating current, an electrode 22, 24, 26, 28 acts as either a current source or a voltage sensor.

Figure 2:
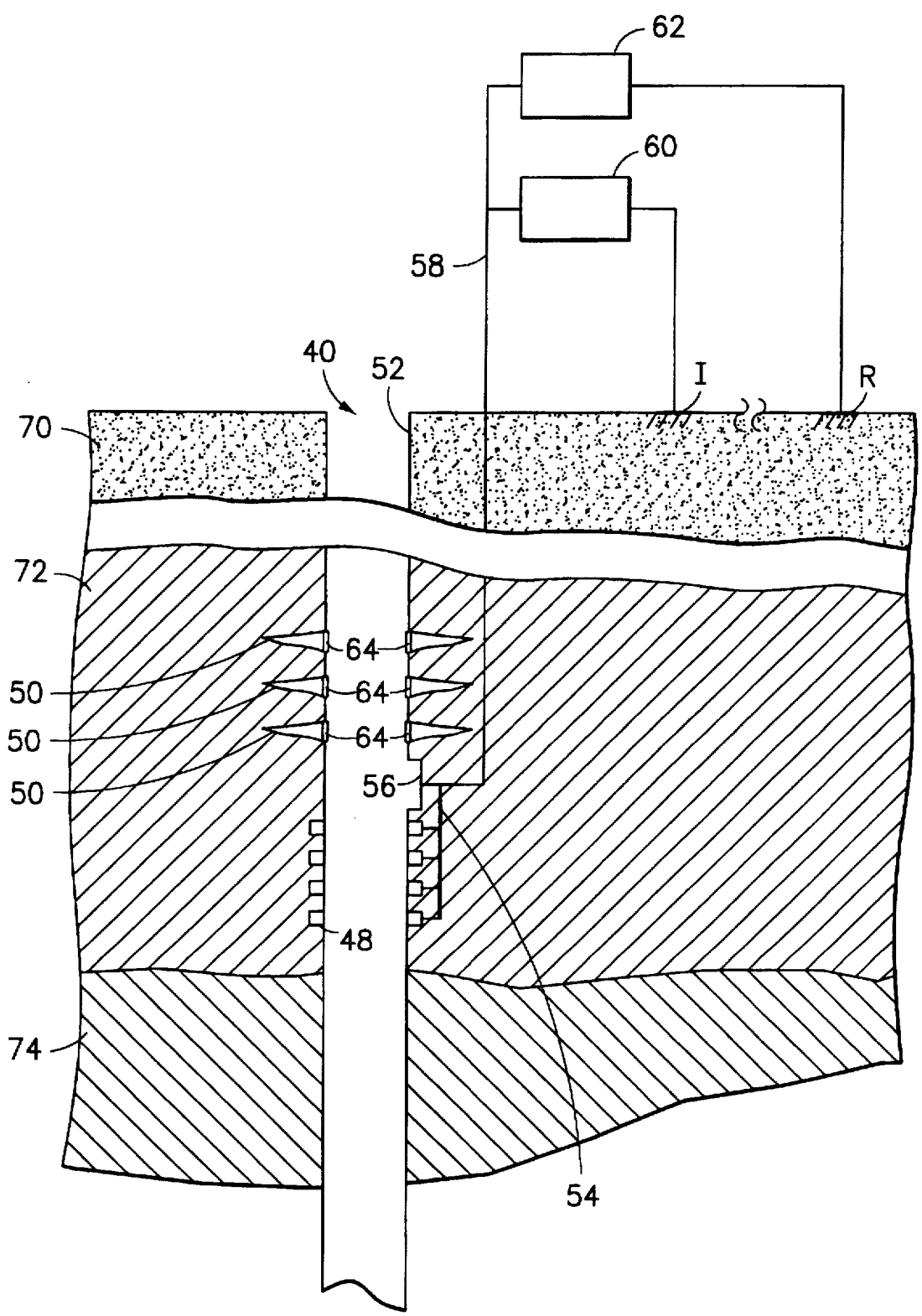

FIG. 2 depicts a vertical well 40 drilled in an earth formation. The well 40 passes through a geological formation 70 and a hydrocarbon bearing formation 72 in contact with a water bearing formation 74. The well 40 may be cased and coated with a non-conductive material that prevents electric currents from stagnating along its outer surface, such as ceramic and/or fiberglass. Also, the cased hole may have perforations 50 to enable inflow of hydrocarbons into the well 40. A plurality of electrodes 42, 44, 46, 48 are spaced apart longitudinally in the well 40 and fixedly mounted on the cylindrical tube 52 forming the casing of the well 40. The electrodes 42, 44 ,46, 48 are connected by contacts and a cable connection 54 to electronic means 56 and fixed to the outside of the casing 52. The electronic means 56 are connected to the surface by an electric connecting cable 58, connected to a current source 60 (alternating or continuous) and processing means 62 for measuring information received from the region of the electrodes 42, 44, 46, 48.

With the embodiments shown in FIG. 1 and FIG. 2, electric or electromagnetic measurements may be obtained when current is injected or, alternatively, induced into the formation. The means for passing current into the formation may include an injection electrode I located at the surface, a current source, and an electrical connection connecting the injection electrode, the current source 34, 60, and the electrodes 22, 24, 26, 28, 42, 44, 46, 48. The resulting potential difference between a reference electrode R and each voltage sensor 22, 24, 26, 28, 42, 44, 46, 48 is measured by means of the data acquisition system 36, 62 which includes a potentiometer. The reference electrode R is preferably located on the surface at a distance from the head of the well 10, 40.

Still referring to FIG. 1 and FIG. 2, gates 29, 64 are installed along the tube 20, 52 for hydrocarbon extraction. As shown in FIG. 2, these gates 29, 64 may be installed at the site of a perforation 50. In the case of a vertical well 40, the extraction gates 64 are substantially distant from the oil-water contact in order to maximize the volume of hydrocarbons produced from the formation before water breakthrough. The gates 28, 64 may be opened or closed, using electrical or mechanical means, to maximize the efficiency with which the well 10, 40 is produced. Once production begins, a drop in pressure along the length interval of extraction causes the original oil-water contact to deform into a three-dimensional shape, such as a cone, parabola, or hyperbola. This deformation affects the DC/AC measurement at each of the plurality of measuring electrodes 22, 24, 26, 28, 42, 44, 46, 48. The measuring system (electrodes 22, 24, 26, 28, 42, 44, 46, 48, data acquisition system 36, 62, current source 34, 60, and electronic means 30, 56) enables continuous monitoring of the shape and location of the oil-water interface as a result of production, and therefore, as a function of time.

Although the overall shape of the deformation remains substantially the same as time progresses, specific values of its width and vertex location, for example, do not remain constant. These parameters cannot always be uniquely predicted from borehole measurements of earth formation properties. However, the shape of the oil-water interface may be defined, for example, by the following equation:

$$z(x,y) = z_0 + \left[ \left( \frac{x-x_0}{a} \right)^2 + \left( \frac{y-y_0}{b} \right)^2 \right]^{1/3} \quad (1)$$

where $(x_0, y_0, z_0)$ is the location of the apex and the variables a and b are measures of the eccentricity in the x and y directions, respectively. In this case, at least five parameters are needed to completely describe both the location and eccentricity formed by the 3-D surface at a given time.

Assumptions based on symmetry can reduce even further the number of needed parameters. Because production causes the oil-water interface to deform into a 3-D surface, the vertex will be centered about the oil extraction point, hence a reduction to one unknown coordinate for its location, i.e., the vertical location $z_0$. The location of the 3-D surface away from its axis of symmetry, in this case, is given by the following equation:

$$r(z) = a \sqrt{\frac{z-z_0}{c}} \quad (2)$$

where $z_0$ is the vertical location of the vertex and the variables a and c determine the vertical eccentricity.

The parametric function for an estimate of the shape and location of the oil-water interface is obtained by minimizing the difference between the measured data and the simulated data in a metric using a Euclidean metric, such difference is given by:

$$P(\underline{x}) = \|\overline{\overline{W}}_d \cdot [\underline{d}(\underline{x}) - \underline{d}^{obs}]\|^2 \; l_i \leq x_i \leq u_i \quad (3)$$

where $\underline{x}$ is a vector of size N containing the unknown parameters that completely define the 3-D shape and location of the oil-water contact; $\underline{d}(\underline{x})$ is a column vector of size M containing the source electrode data simulated numerically for a given $\underline{x}$; $\underline{d}^{obs}$ is a column vector of size M containing the voltages measured with the source electrodes deployed along the well; $\overline{\overline{W}}_d$ is a data weighting matrix which is used to emphasize certain subsets of the data in relation to others; and, $l_i$ and $u_i$ are lower and upper bounds, respectively, imposed on the entries $x_i$ of vector $\underline{x}$. Other metrics are within contemplation of the subject invention, including, but not limited to, $l_1$-norm and $l_\infty$-norm.

A nonlinear technique may preferably be used to invert and solve for the extremum, $\underline{x}$, of $P(\underline{x})$ such that the differences between the measured data and the numerically simulated data are minimized utilizing a suitable minimization algorithm which includes, but is not limited to, a least squares optimization algorithm. The estimation embodied in equation (3) is robust in the presence of relatively high levels of noise and can be used to anticipate deleterious water breakthroughs as well as improve the efficiency with which hydrocarbons are produced from the well 10, 40. The estimation is performed at predetermined times during production. This will enable tracking the geometry of the oil-water interface and the proximity of the water column into the well 10, 40. Also, the estimation is used to control the opening or closing of a gate 28, 64 to maximize hydrocarbon extraction and avert a deleterious water breakthrough.

The foregoing description of the preferred and alternate embodiments of the present invention have been presented for purposes of illustration and description. It is not intended to be exhaustive or limit the invention to the precise form disclosed. Obviously, many modifications and variations will be apparent to those skilled in the art. For example, a rigid logging tool having a plurality of sources and receivers may be deployed and moved inside the well to acquire the electric or electromagnetic measurements. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What I claim is:

1. A method of estimating a location and a shape of an oil-water interface during oil production in an earth formation traversed by a well, comprising the steps of:

a) injecting a current into the formation;
   b) acquiring measurements of an electrical parameter in the formation;
   c) assigning a 3-D geometrical shape to the oil-water interface;
   d) selecting a parametric function which describes the shape of the oil-water interface; and,
   e) estimating parameters of the parametric function to determine the location and shape of the oil-water interface.

2. The method according to claim 1, wherein the steps thereof are continuously repeated as a function of time during oil production in order to track the proximity of a water column into the well.

3. The method according to claim 2, wherein the parameters of the parametric function are estimated by incorporating the measurements acquired in step (b).

4. The method according to claim 3, further comprising the step of positioning each of a plurality of extraction gates thereby precluding entry of the water column into the well.

5. The method according to claim 1, wherein step (b) further comprises using a plurality of electrodes permanently affixed in the well to acquire the measurements.

6. The method according to claim 5, wherein the electrical parameter is an electric DC signal.

7. The method according to claim 5, wherein the electrical parameter is an electromagnetic AC signal.

8. The method according to claim 1, wherein the geometrical shape is a combination of simple canonical functions.

9. The method according to claim 1 wherein step (b) further comprises positioning a rigid logging tool in the well, the tool having a plurality of sources and receivers to acquire the measurements.

10. The method according to claim 9 further comprising the step of moving the tool in the well to acquire the measurements across the oil-water interface.

11. The method according to claim 10, wherein the electrical parameter is an electric DC signal.

12. The method according to claim 10, wherein the electrical parameter is an electromagnetic AC signal.

* * * * *